US012781360B2

(12) United States Patent
Dawson

(10) Patent No.: US 12,781,360 B2
(45) Date of Patent: Nov. 3, 2026

(54) ELECTROCHEMICAL HYDROGEN PRODUCTION VIA AMMONIA CRACKING

(71) Applicant: Utility Global, Inc., Houston, TX (US)

(72) Inventor: Matthew Dawson, Katy, TX (US)

(73) Assignee: Utility Global, Inc., Houston, TX (US)

( * ) Notice: Subject to any disclaimer, the term of this patent is extended or adjusted under 35 U.S.C. 154(b) by 545 days.

(21) Appl. No.: 18/493,109

(22) Filed: Oct. 24, 2023

(65) Prior Publication Data

US 2024/0200210 A1 Jun. 20, 2024

Related U.S. Application Data

(60) Provisional application No. 63/433,308, filed on Dec. 16, 2022.

(51) Int. Cl.

| | |
|---|---|
| ***C25B 9/19*** | (2021.01) |
| ***C25B 1/02*** | (2006.01) |
| ***C25B 11/031*** | (2021.01) |
| ***C25B 11/077*** | (2021.01) |
| ***C25B 13/07*** | (2021.01) |

(Continued)

(52) U.S. Cl.
CPC .................. *C25B 9/19* (2021.01); *C25B 1/02* (2013.01); *C25B 11/077* (2021.01); *C25B 13/07* (2021.01); *C25B 15/021* (2021.01); *C25B 15/083* (2021.01); *C25B 9/015* (2021.01); *C25B 11/031* (2021.01); *H01M 8/222* (2013.01)

(58) Field of Classification Search
CPC ........... C25B 1/02; C25B 9/19; C25B 11/077; C25B 11/0771; C25B 11/0773; C25B 11/0775; C01B 3/04; Y02E 60/36; Y02E 60/50; H01M 8/222
See application file for complete search history.

(56) References Cited

U.S. PATENT DOCUMENTS

2011/0177407 A1* 7/2011 Majima ............... H01M 4/8652 204/252
2020/0140297 A1 5/2020 Hall et al.
(Continued)

FOREIGN PATENT DOCUMENTS

CA 3210989 A1 11/2022
JP 4501160 B2 7/2010
(Continued)

OTHER PUBLICATIONS

International Search Report and Written Opinion for PCT/US2023/077619 dated Feb. 16, 2024.
(Continued)

*Primary Examiner* — Michael E Barr
*Assistant Examiner* — Colton Busa Forry
(74) *Attorney, Agent, or Firm* — Foley & Lardner LLP

(57) ABSTRACT

Herein discussed is a method of producing hydrogen comprising: (a) providing an electrochemical reactor having an anode, a cathode, and a membrane between the anode and the cathode, wherein the membrane conducts both electrons and protons, wherein the anode and cathode are porous; (b) introducing a first stream to the anode, wherein the first stream comprises ammonia or a cracked ammonia product; and (c) extracting a second stream from the cathode, wherein the second stream comprises hydrogen, wherein the first stream and the second stream are separated by the membrane.

21 Claims, 2 Drawing Sheets

(51) Int. Cl.

| | |
|---|---|
| ***C25B 15/021*** | (2021.01) |
| ***C25B 15/08*** | (2006.01) |
| ***H01M 8/22*** | (2006.01) |
| *C25B 9/015* | (2021.01) |

(56) References Cited

U.S. PATENT DOCUMENTS

| | | | | |
|---|---|---|---|---|
| 2020/0144627 | A1 | 5/2020 | Hall et al. | |
| 2020/0144628 | A1 | 5/2020 | Hall et al. | |
| 2020/0144633 | A1 | 5/2020 | Hall et al. | |
| 2020/0144635 | A1 | 5/2020 | Hall et al. | |
| 2020/0144646 | A1 | 5/2020 | Hall et al. | |
| 2020/0144647 | A1 | 5/2020 | Hall et al. | |
| 2020/0144648 | A1 | 5/2020 | Hall et al. | |
| 2020/0144653 | A1 | 5/2020 | Hall et al. | |
| 2020/0144654 | A1 | 5/2020 | Hall et al. | |
| 2020/0156104 | A1 | 5/2020 | Hall et al. | |
| 2020/0161684 | A1* | 5/2020 | Yan | B01D 53/326 |
| 2020/0176803 | A1 | 6/2020 | Hall et al. | |
| 2020/0182549 | A1 | 6/2020 | Hall et al. | |
| 2020/0227763 | A1 | 7/2020 | Hall et al. | |
| 2020/0235409 | A1 | 7/2020 | Hall et al. | |
| 2020/0235410 | A1 | 7/2020 | Hall et al. | |
| 2020/0255959 | A1 | 8/2020 | Hall et al. | |
| 2020/0255962 | A1* | 8/2020 | Hall | C25B 1/04 |
| 2020/0255963 | A1 | 8/2020 | Dawson et al. | |
| 2020/0259186 | A1 | 8/2020 | Hall et al. | |
| 2020/0303749 | A1 | 9/2020 | Hall et al. | |
| 2021/0024425 | A1 | 1/2021 | Dawson et al. | |
| 2021/0069786 | A1 | 3/2021 | Hall et al. | |
| 2021/0121978 | A1 | 4/2021 | Dawson et al. | |
| 2021/0175531 | A1* | 6/2021 | Farandos | C01B 3/382 |
| 2022/0002151 | A1* | 1/2022 | Katikaneni | C01B 3/047 |
| 2022/0364245 | A1 | 11/2022 | Farandos et al. | |
| 2022/0364251 | A1 | 11/2022 | Dawson et al. | |
| 2022/0372635 | A1 | 11/2022 | Farandos et al. | |
| 2022/0380210 | A1 | 12/2022 | Farandos et al. | |
| 2022/0403532 | A1 | 12/2022 | Farandos et al. | |
| 2023/0002915 | A1 | 1/2023 | Dawson et al. | |
| 2023/0013911 | A1 | 1/2023 | Dawson et al. | |
| 2023/0020427 | A1 | 1/2023 | Farandos et al. | |
| 2023/0092683 | A1 | 3/2023 | Farandos et al. | |
| 2023/0109683 | A1 | 4/2023 | Dawson et al. | |
| 2023/0167560 | A1 | 6/2023 | Dawson et al. | |
| 2023/0175143 | A1 | 6/2023 | Farandos et al. | |
| 2024/0133052 | A1 | 4/2024 | Matthews et al. | |
| 2024/0133062 | A1 | 4/2024 | Dawson et al. | |
| 2024/0167169 | A1 | 5/2024 | Dawson et al. | |
| 2024/0200210 | A1 | 6/2024 | Dawson | |
| 2024/0209530 | A1 | 6/2024 | Dawson et al. | |
| 2024/0229253 | A9 | 7/2024 | Matthews et al. | |
| 2024/0287688 | A1 | 8/2024 | Dawson et al. | |
| 2024/0287689 | A1 | 8/2024 | Dawson et al. | |
| 2024/0417867 | A1 | 12/2024 | Dawson et al. | |
| 2024/0417869 | A1 | 12/2024 | Dawson et al. | |
| 2025/0011945 | A1 | 1/2025 | Dawson et al. | |
| 2025/0146147 | A1 | 5/2025 | Dawson | |
| 2025/0236962 | A1 | 7/2025 | Dawson et al. | |
| 2025/0347480 | A1 | 11/2025 | Kelley et al. | |
| 2026/0055518 | A1 | 2/2026 | Dana et al. | |
| 2026/0100384 | A1 | 4/2026 | Dawson | |
| 2026/0125811 | A1 | 5/2026 | Farandos et al. | |

FOREIGN PATENT DOCUMENTS

| | | | | |
|---|---|---|---|---|
| JP | 2017050180 | A * | 3/2017 | |
| WO | WO-2018/237042 | A2 | 12/2018 | |
| WO | WO-2022/189664 | A1 | 9/2022 | |
| WO | WO-2022/240954 | A1 | 11/2022 | |
| WO | WO-2022245081 | A1 * | 11/2022 | C25B 15/08 |
| WO | WO-2023/278252 | A1 | 1/2023 | |
| WO | WO-2023/278347 | A1 | 1/2023 | |
| WO | WO-2023/063968 | A1 | 4/2023 | |

OTHER PUBLICATIONS

Modisha, P. et al., “Electrocatalytic Process for Ammonia Electrolysis: A Remediation Technique with Hydrogen Co-Generation”, International Journal of Electrochemical Science, 2016, vol. 11, pp. 6627-6635.

* cited by examiner

ELECTROCHEMICAL HYDROGEN PRODUCTION VIA AMMONIA CRACKING

CROSS-REFERENCE TO RELATED APPLICATIONS

This application claims the benefit under 35 U.S.C. 119(e) of U.S. Provisional Patent Application No. 63/433,308 filed Dec. 16, 2022, the entire disclosure of which is hereby incorporated herein by reference.

TECHNICAL FIELD

This invention generally relates to hydrogen production. More specifically, this invention relates to electrochemical hydrogen production using ammonia.

BACKGROUND

Hydrogen in large quantities is needed in the petroleum and chemical industries. For example, large amounts of hydrogen are used in upgrading fossil fuels and in the production of methanol or hydrochloric acid. Petrochemical plants need hydrogen for hydrocracking, hydrodesulfurization, hydrodealkylation. Hydrogenation processes to increase the level of saturation of unsaturated fats and oils also need hydrogen. Hydrogen is also a reducing agent of metallic ores. Hydrogen may be produced from electrolysis of water, steam reforming, lab-scale metal-acid process, thermochemical methods, or anaerobic corrosion. Many countries are aiming at a hydrogen economy, which requires transportation of large quantities of hydrogen. Ammonia has been identified as a suitable surrogate molecule for hydrogen transport as it is comparatively easy to contain and transmit compared to either pressurized or liquified hydrogen. However, ammonia by itself is not easily utilized and must be transformed to hydrogen. This transformation process unfortunately produces hydrogen mixed with nitrogen and these two gases are difficult to separate easily, efficiently, or economically. To be useful in conventional systems and processes, the hydrogen must be separated from the nitrogen.

Clearly there is an increasing need and interest to develop new technological platforms to produce hydrogen. This disclosure discusses hydrogen production utilizing ammonia via efficient electrochemical pathways. The electrochemical reactor and the method to perform such reactions are discussed.

SUMMARY

Herein discussed is a method of producing hydrogen comprising: (a) providing an electrochemical reactor having an anode, a cathode, and a membrane between the anode and the cathode, wherein the membrane conducts both electrons and protons, wherein the anode and cathode are porous; (b) introducing a first stream to the anode, wherein the first stream comprises ammonia or a cracked ammonia product; and (c) extracting a second stream from the cathode, wherein the second stream comprises hydrogen, wherein the first stream and the second stream are separated by the membrane.

In an embodiment, wherein ammonia cracking takes place in situ at the anode. In an embodiment, the method comprises applying vacuum to the cathode. In an embodiment, the membrane, the anode and the cathode have the same elements.

In an embodiment, the membrane, the anode, and the cathode comprise a proton-conducting phase and an electron-conducting phase. In an embodiment, the proton-conducting phase comprises $BaHf_xCe_{0.8-x}Y_{0.1}Yb_{0.1}O_{3-\delta}$ (BHCYYb), $BaZr_xCe_{0.8-x}Y_{0.1}Yb_{0.1}O_{3-\delta}$ (BZCYYb), Yttrium-doped barium zirconate, Yttrium-Doped Barium Zirconate-Cerate, Barium zirconate-cerate, or combinations thereof. In an embodiment, the electron-conducting phase comprises doped lanthanum chromite, lanthanum-doped strontium titanate (LST), an electronically conductive metal, or combinations thereof.

In an embodiment, the LST comprises $LaSrCaTiO_3$. In an embodiment, the conductive metal comprises Ni, Cu, Ag, Au, Pt, Rh, Co, Ru, or combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof.

In an embodiment, hydrogen partial pressure at the anode is higher than that at the cathode. In an embodiment, the method comprises introducing steam to the cathode.

Also discussed herein is a hydrogen production system comprising an ammonia source or a cracked ammonia product source, and an electrochemical (EC) reactor comprising an anode, a cathode, and a membrane between the anode and the cathode, wherein the membrane conducts both electrons and protons, wherein the anode and cathode are porous, wherein the EC reactor is configured to receive a first stream from the ammonia or cracked ammonia product source on the anode side, wherein the EC reactor is configured to output a second stream on the cathode side, wherein the second stream comprises hydrogen.

In an embodiment, the reactor comprises no interconnect and no current collector. In an embodiment, the anode, the cathode, and the membrane have the same elements. In an embodiment, the anode, the cathode, and the membrane comprise a proton-conducting phase and an electron-conducting phase. In an embodiment, the proton-conducting phase comprises $BaHf_xCe_{0.8-x}Y_{0.1}Yb_{0.1}O_{3-\delta}$ (BHCYYb), $BaZr_xCe_{0.8-x}Y_{0.1}Yb_{0.1}O_{3-\delta}$ (BZCYYb), Yttrium-doped barium zirconate, Yttrium-Doped Barium Zirconate-Cerate, Barium zirconate-cerate, or combinations thereof.

In an embodiment, the electron-conducting phase comprises doped lanthanum chromite, lanthanum-doped strontium titanate (LST), an electronically conductive metal, or combinations thereof. In an embodiment, the LST comprises $LaSrCaTiO_3$. In an embodiment, the conductive metal comprises Ni, Cu, Ag, Au, Pt, Rh, Co, Ru, or combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof.

In an embodiment, the cathode is configured to receive a vacuum. In an embodiment, the first stream and the second stream are separated by the membrane. In an embodiment, the reactor is configured to operate at a temperature of 500° C. or higher. In an embodiment, hydrogen partial pressure at the anode is higher than that at the cathode. In an embodiment, the cathode is also configured to receive steam.

Further aspects and embodiments are provided in the following drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Overview

Figure 1:
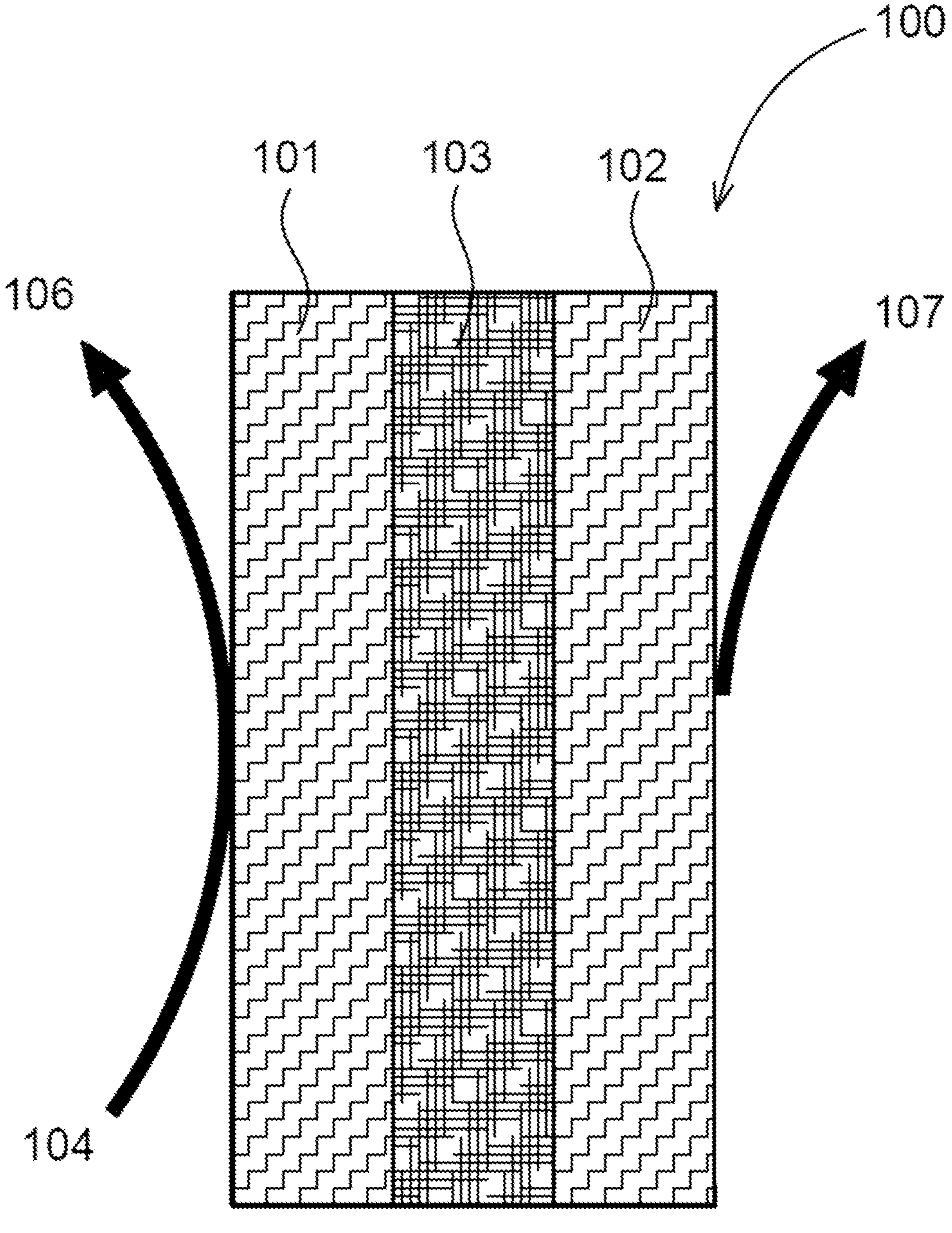
FIG. 1 illustrates an electrochemical (EC) reactor, according to an embodiment of this disclosure.

Ammonia is an abundant and common chemical shipped around the globe. Furthermore, ammonia (unlike hydrogen) does not need to be stored under high pressure or cryogenically; and ammonia has ten times the energy density of a lithium-ion battery. As such, utilizing ammonia to produce hydrogen is very advantageous if it is done efficiently and economically. The disclosure herein discusses electrochemical systems and methods that are suitable for producing hydrogen using ammonia.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms “a,” “an,” and “the” include plural referents unless the context clearly dictates otherwise. For example, reference to “a substituent” encompasses a single substituent as well as two or more substituents, and the like. As used herein, “for example,” “for instance,” “such as,” or “including” are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

As used herein, YSZ refers to yttria-stabilized zirconia; SDC refers to samaria-doped ceria; SSZ refers to scandia-stabilized zirconia; LSGM refers to lanthanum strontium gallate magnesite.

In this disclosure, no substantial amount of $H_2$ means that the volume content of the hydrogen is no greater than 5%, or no greater than 3%, or no greater than 2%, or no greater than 1%, or no greater than 0.5%, or no greater than 0.1%, or no greater than 0.05%.

As used herein, CGO refers to Gadolinium-Doped Ceria, also known alternatively as gadolinia-doped ceria, gadolinium-doped cerium oxide, cerium(IV) oxide, gadolinium-doped, GDC, or GCO, (formula $Gd:CeO_2$). CGO and GDC are used interchangeably unless otherwise specified. Syngas (i.e., synthesis gas) in this disclosure refers to a mixture consisting primarily of hydrogen, carbon monoxide and carbon dioxide.

A mixed conducting membrane is able to transport both electrons and ions. Ionic conductivity includes ionic species such as oxygen ions (or oxide ions), protons, halogenide anions, chalcogenide anions. In various embodiment, the mixed conducting membrane of this disclosure comprises an electronically conducting phase and an ionically conducting phase.

In this disclosure, the axial cross section of the tubulars is shown to be circular, which is illustrative only and not limiting. The axial cross section of the tubulars is any suitable shape as known to one skilled in the art, such as square, square with rounded corners, rectangle, rectangle with rounded corners, triangle, hexagon, pentagon, oval, irregular shape, etc.

As used herein, ceria refers to cerium oxide, also known as ceric oxide, ceric dioxide, or cerium dioxide, is an oxide of the rare-earth metal cerium. Doped ceria refers to ceria doped with other elements, such as samaria-doped ceria (SDC), or gadolinium-doped ceria (GDC or CGO). As used herein, chromite refers to chromium oxides, which includes all the oxidation states of chromium oxides.

A layer or substance being impermeable as used herein refers to it being impermeable to fluid flow. For example, an impermeable layer or substance has a permeability of less than 1 micro darcy, or less than 1 nano darcy.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece.

The term “in situ” in this disclosure refers to the treatment (e.g., heating or cracking) process being performed either at the same location or in the same device. For example, ammonia cracking taking place in the electrochemical reactor at the anode is considered in situ.

Electrochemistry is the branch of physical chemistry concerned with the relationship between electrical potential, as a measurable and quantitative phenomenon, and identifiable chemical change, with either electrical potential as an outcome of a particular chemical change, or vice versa. These reactions involve electrons moving between electrodes via an electronically-conducting phase (typically, but not necessarily, an external electrical circuit), separated by an ionically-conducting and electronically insulating membrane (or ionic species in a solution). When a chemical reaction is effected by a potential difference, as in electrolysis, or if electrical potential results from a chemical reaction as in a battery or fuel cell, it is called an electrochemical reaction. Unlike chemical reactions, in electrochemical reactions electrons (and necessarily resulting ions), are not transferred directly between molecules, but via the aforementioned electronically conducting and ionically conducting circuits, respectively. This phenomenon is what distinguishes an electrochemical reaction from a chemical reaction.

Related to the electrochemical reactor and methods of use, various components of the reactor are described such as electrodes and membranes along with materials of construction of the components. The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

An interconnect in an electrochemical device (e.g., a fuel cell) is often either metallic or ceramic that is placed between the individual cells or repeat units. Its purpose is to connect each cell or repeat unit so that electricity can be distributed or combined. An interconnect is also referred to as a bipolar plate in an electrochemical device. An interconnect being an impermeable layer as used herein refers to it being a layer that is impermeable to fluid flow.

Electrochemical Reactor

FIG. 1 illustrates an electrochemical (EC) reactor 100, according to an embodiment of this disclosure. EC reactor 100 comprises first electrode 101, membrane 103 a second electrode 102. First electrode 101 (also referred to as anode or bi-functional layer) is configured to receive a first stream 104 containing ammonia or a cracked ammonia product. In an embodiment, cracked ammonia product comprises hydrogen, nitrogen, and optionally ammonia. Stream 106 is the exhaust stream from the first electrode or anode 101, that contains, e.g., ammonia, hydrogen, nitrogen.

Second electrode or cathode 102 is configured to output a second stream 107 that contains hydrogen. In embodiments, the hydrogen produced from second electrode 102 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water. In various embodiments, the first stream and the second stream are separated by the membrane.

In various embodiments, the device does not contain a current collector. In an embodiment, the device comprises no interconnect. There is no need for electricity and such a device is not an electrolyzer. This is a major advantage of the EC reactor of this disclosure. The membrane 103 is configured to conduct electrons and as such is mixed conducting, i.e., both electronically conductive and ionically conductive. In an embodiment, the membrane 103 conducts protons and electrons. In an embodiment, the electrodes 101, 102 and the membrane 103 are tubular (see, e.g., FIGS. 2A and 2B). In an embodiment, the electrodes 101, 102 and the membrane 103 are planar. In these embodiments, the electrochemical reactions at the anode and the cathode are spontaneous without the need to apply potential/electricity to the reactor.

In an embodiment, the reactor comprises porous electrodes. In various embodiments, the electrodes have no current collector attached to them. In various embodiments, the reactor does not contain any current collector. Clearly, such a reactor is fundamentally different from any electrolysis device or fuel cell. In various embodiments, the anode, the cathode, and the membrane have the same elements.

In various embodiments, the anode, the cathode, and the membrane comprise a proton-conducting phase and an electron-conducting phase. In various embodiments, the proton-conducting phase comprises Barium zirconate-cerate, Yttrium-doped barium zirconate, $BaHf_xCe_{0.8-x}Y_{0.1}Yb_{0.1}O_{3-\delta}$ (BHCYYb), $BaZr_xCe_{0.8-x}Y_{0.1}Yb_{0.1}O_{3-\delta}$ (BZCYYb), Yttrium-Doped Barium Zirconate-Cerate, or combinations thereof.

In various embodiments, the electron-conducting phase comprises doped lanthanum chromite, lanthanum-doped strontium titanate (LST), an electronically conductive metal, or combinations thereof. In various embodiments, LST comprises $LaSrCaTiO_3$. In various embodiments, the conductive metal comprises Ni, Cu, Ag, Au, Pt, Rh, Co, Ru, or combinations thereof. In various embodiments, the doped lanthanum chromite comprises strontium doped lanthanum chromite, iron doped lanthanum chromite, strontium and iron doped lanthanum chromite, lanthanum calcium chromite, or combinations thereof.

Figure 2A:
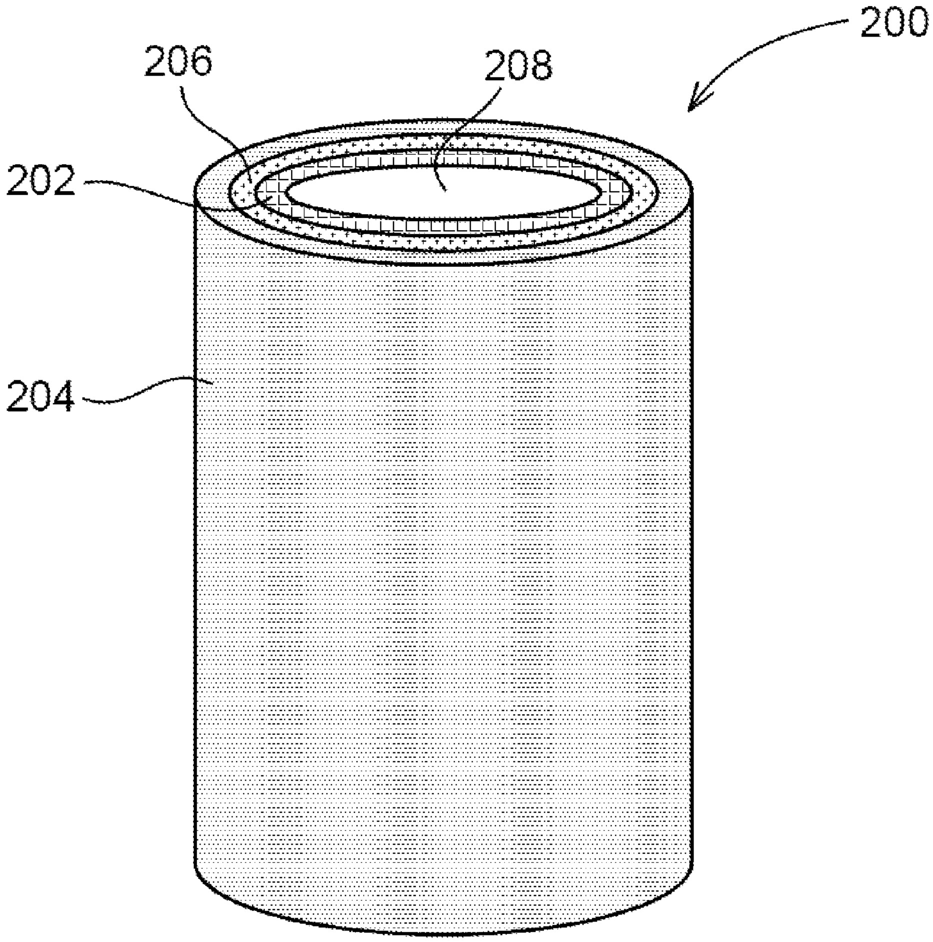
FIG. 2A illustrates a tubular electrochemical reactor, according to an embodiment of this disclosure.
Figure 2B:
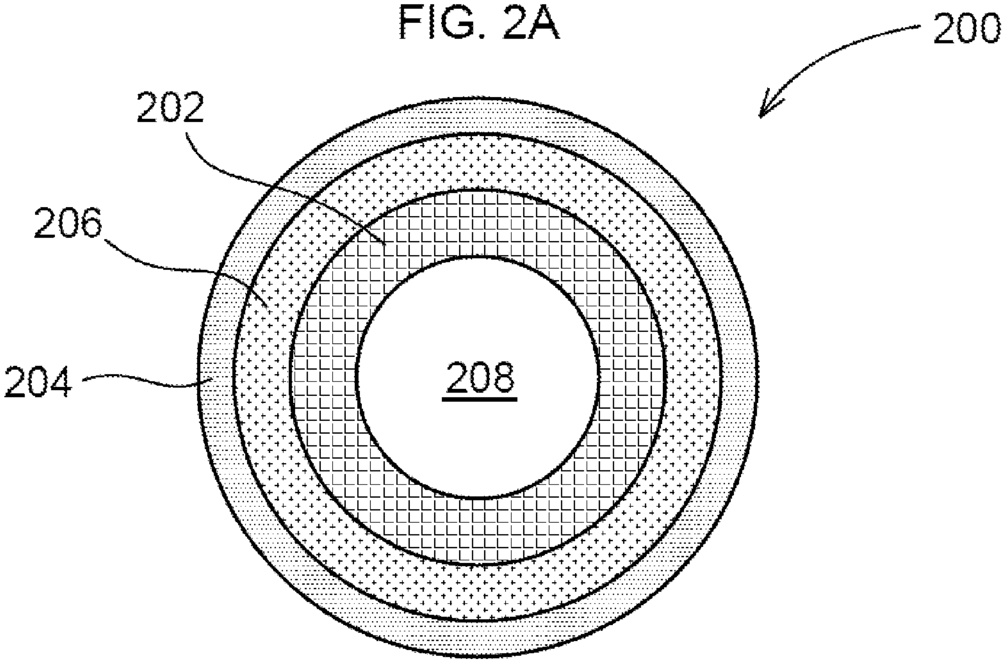
FIG. 2B illustrates a cross section of a tubular electrochemical reactor, according to an embodiment of this disclosure.

FIG. 2A illustrates (not to scale) a tubular electrochemical (EC) reactor 200, according to an embodiment of this disclosure. Tubular reactor 200 includes an inner tubular structure 202, an outer tubular structure 204, and a membrane 206 disposed between the inner and outer tubular structures 202, 204, respectively. Tubular reactor 200 further includes a void space 208 for fluid passage. FIG. 2B illustrates (not to scale) a cross section of a tubular producer 200, according to an embodiment of this disclosure. Tubular reactor 200 includes a first inner tubular structure 202, a second outer tubular structure 204, and a membrane 206 between the inner and outer tubular structures 202, 204. Tubular reactor 200 further includes a void space 208 for fluid passage.

In an embodiment, the electrodes and the membrane are tubular with the first electrode or anode being outermost and the second electrode or cathode being innermost, wherein the second electrode or cathode is configured to output hydrogen. In an embodiment, the electrodes and the membrane are tubular with the first electrode or anode being innermost and the second electrode or cathode being outermost, wherein the second electrode or cathode is configured to output hydrogen. In an embodiment, the electrodes and the membrane are tubular.

Hydrogen Production Using Ammonia

The EC reactor as discussed above is suitable to produce hydrogen from ammonia. Ammonia or a product from ammonia cracking comprising hydrogen and nitrogen is sent to the anode of the EC reactor directly as the feed stream. In various embodiments, in-situ ammonia cracking takes place at the anode.

Hydrogen dissociates into protons and electrons at the anode, which are transported via the membrane to reach the cathode, where they are re-combined to form molecular hydrogen. Other gases (e.g., $N_2$ or $NH_3$) have no way to pass through the membrane to the cathode side and thus separation and purification of hydrogen are spontaneously accomplished via electrochemical pathways. In various embodiments, there is a pressure differential between the anode and the cathode, which further facilitates hydrogen production on the cathode side. In various embodiments, the cathode is configured to receive a vacuum. In various embodiments, hydrogen partial pressure at the anode is higher than that at the cathode. In various embodiments, steam is introduced to the cathode.

The produced hydrogen has sufficiently high purity to be directly used by consumers. In some cases, hydrogen is used in a FT reactor to produce synthetic fuels and/or synthetic lubricants. In some cases, hydrogen is stored or used in an electrochemical device to produce electricity or to fuel vehicles. In some cases, hydrogen is used in a Sabatier reaction. In some cases, hydrogen is used to produce ammonia/fertilizer. In some cases, hydrogen is used in hydrogenation processes. In various embodiments, the reactor is configured to operate at a temperature of 500° C. or higher. In various embodiments, the reactor is configured to operate at a temperature of 600° C. or higher. In various embodiments, the reactor is configured to operate at a temperature of 700° C. or higher. In various embodiments, the reactor is configured to operate at a temperature of 800° C. or higher.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of producing hydrogen comprising:

(a) providing an electrochemical reactor having an anode, a cathode, and a membrane between the anode and the cathode, wherein the membrane conducts both electrons and protons, wherein the anode and cathode are porous, and wherein the membrane comprises a proton-conducting phase and an electron-conducting phase, wherein the proton-conducting phase comprises BaHfxCe0.8-xY0.1Yb0.1O3-δ (BHCYYb), BaZrxCe0.8-xY0.1Yb0.1O3-δ (BZCYYb), Yttrium-doped barium zirconate, Yttrium-Doped Barium Zirconate-Cerate, Barium zirconate-cerate, or combinations thereof;

(b) introducing a first stream to the anode, wherein the first stream comprises ammonia or a cracked ammonia product; and (c) extracting a second stream from the cathode, wherein the second stream comprises hydrogen, wherein the first stream and the second stream are separated by the membrane.

2. The method of claim 1, wherein ammonia cracking takes place in situ at the anode.

3. The method of claim 1 comprising applying vacuum to the cathode.

4. The method of claim 1, wherein the membrane, the anode and the cathode have the same compositional elements.

5. The method of claim 1, wherein the membrane, the anode, and the cathode comprise a proton-conducting phase and an electron-conducting phase.

6. The method of claim 5, wherein the proton-conducting phase of the anode and the cathode comprises $BaHf_xCe_{0.8-x}Y_{0.1}Yb_{0.1}O_{3-\delta}$ (BHCYYb), $BaZr_xCe_{0.8-x}Y_{0.1}Yb_{0.1}O_{3-\delta}$ (BZCYYb), Yttrium-doped barium zirconate, Yttrium-Doped Barium Zirconate-Cerate, Barium zirconate-cerate, or combinations thereof.

7. The method of claim 5, wherein the electron-conducting phase comprises doped lanthanum chromite, lanthanum-doped strontium titanate (LST), an electronically conductive metal, or combinations thereof.

8. The method of claim 1, wherein hydrogen partial pressure at the anode is higher than that at the cathode.

9. A hydrogen production system comprising:

an ammonia source or a cracked ammonia product source, and an electrochemical (EC) reactor comprising an anode, a cathode, and a membrane between the anode and the cathode, wherein the membrane conducts both electrons and protons, wherein the anode and cathode are porous, and wherein the membrane comprises a proton-conducting phase and an electron-conducting phase, wherein the proton-conducting phase comprises BaHfxCe0.8-xY0.1Yb0.1O3-δ (BHCYYb), BaZrxCe0.8-xY0.1Yb0.1O3-δ BZCYYb), Yttrium-doped barium zirconate, Yttrium-Doped Barium Zirconate-Cerate, Barium zirconate-cerate, or combinations thereof, wherein the EC reactor is configured to receive a first stream from the ammonia or cracked ammonia product source on the anode side, wherein the EC reactor is configured to output a second stream on the cathode side, wherein the second stream comprises hydrogen.

10. The system of claim 9, wherein the reactor comprises no interconnect and no current collector.

11. The system of claim 9, wherein the anode, the cathode, and the membrane have the same compositional elements.

12. The system of claim 9, wherein the anode, the cathode, and the membrane comprise a proton-conducting phase and an electron-conducting phase.

13. The system of claim 12, wherein the proton-conducting phase of the anode and the cathode comprises $BaHf_xCe_{0.8-x}Y_{0.1}$ $Yb_{0.1}O_{3-\delta}$ (BHCYYb), $BaZr_xCe_{0.8-x}Y_{0.1}Yb_{0.1}O_{3-\delta}$ (BZCYYb), Yttrium-doped barium zirconate, Yttrium-Doped Barium Zirconate-Cerate, Barium zirconate-cerate, or combinations thereof.

14. The system of claim 12, wherein the electron-conducting phase comprises doped lanthanum chromite, lanthanum-doped strontium titanate (LST), an electronically conductive metal, or combinations thereof.

15. The system of claim 14, wherein the LST comprises $LaSrCaTiO_3$.

16. The system of claim 14, wherein the conductive metal comprises Ni, Cu, Ag, Au, Pt, Rh, Co, Ru, or combinations thereof.

17. The system of claim 14, wherein the doped lanthanum chromite comprises strontium doped lanthanum chromite, iron doped lanthanum chromite, strontium and iron doped lanthanum chromite, lanthanum calcium chromite, or combinations thereof.

18. The system of claim 9, wherein the cathode is configured to receive a vacuum.

19. The system of claim 9, wherein the first stream and the second stream are separated by the membrane.

20. The system of claim 9, wherein the reactor is configured to operate at a temperature of 500° C. or higher.

21. The system of claim 9, wherein hydrogen partial pressure at the anode is higher than that at the cathode.

* * * * *